(12) United States Patent
Harada

(10) Patent No.: US 9,373,061 B2
(45) Date of Patent: Jun. 21, 2016

(54) NON-TRANSITORY COMPUTER-READABLE STORAGE MEDIUM, COMPUTING DEVICE, AND DISPLAY METHOD OF USER INTERFACE OF PRINTER DRIVER

(71) Applicant: Konica Minolta, Inc., Tokyo (JP)

(72) Inventor: Yoshiyuki Harada, Tokyo (JP)

(73) Assignee: Konica Minolta, Inc., Tokyo (JP)

( * ) Notice: Subject to any disclaimer, the term of this patent is extended or adjusted under 35 U.S.C. 154(b) by 0 days.

(21) Appl. No.: 14/705,775

(22) Filed: May 6, 2015

(65) Prior Publication Data

US 2015/0324667 A1    Nov. 12, 2015

(30) Foreign Application Priority Data

May 8, 2014    (JP) .................................. 2014-096484

(51) Int. Cl.
*G06F 3/12*    (2006.01)
*G06K 15/00*    (2006.01)
*H04N 1/00*    (2006.01)

(52) U.S. Cl.
CPC ............ *G06K 15/007* (2013.01); *G06F 3/1205* (2013.01); *G06F 3/1253* (2013.01); *G06F 3/1276* (2013.01); *H04N 1/00506* (2013.01); *H04N 2201/0094* (2013.01)

(58) Field of Classification Search
None
See application file for complete search history.

(56) References Cited

U.S. PATENT DOCUMENTS

| | | | | |
|---|---|---|---|---|
| 2005/0225795 A1 | 10/2005 | Nuggehalli et al. | | |
| 2011/0075176 A1* | 3/2011 | Nishio | ................... | G06F 3/1205 358/1.13 |
| 2011/0242581 A1* | 10/2011 | Lee | ......................... | G06F 3/122 358/1.15 |
| 2012/0044534 A1* | 2/2012 | Ichikawa | .............. | G06F 3/1204 358/1.15 |
| 2012/0069366 A1* | 3/2012 | Heffner | ................. | G06F 3/1204 358/1.13 |
| 2014/0043636 A1* | 2/2014 | Akatsu | ................... | G06F 3/1297 358/1.13 |
| 2014/0293312 A1* | 10/2014 | Fukasawa | .......... | G06K 15/1806 358/1.13 |
| 2014/0293345 A1* | 10/2014 | Harada | .................. | G06F 3/1256 358/1.15 |
| 2015/0124276 A1* | 5/2015 | Harada | .................. | G06F 3/1205 358/1.13 |

FOREIGN PATENT DOCUMENTS

| | | |
|---|---|---|
| JP | 2005-302031 A | 10/2005 |
| JP | 2008-204169 A | 9/2008 |
| JP | 2013-175080 A | 9/2013 |

* cited by examiner

Primary Examiner — Dung Tran
(74) Attorney, Agent, or Firm — Osha Liang LLP

(57) ABSTRACT

A non-transitory computer-readable storage medium storing a printer driver includes a printer driver core component and a print setup user interface component. The print setup user interface component causes the computing device to control a display section to display one or more setup user interface portions by determining whether a setup user interface portion designated by designation information obtained from the printer driver core component is implemented in the print setup user interface component; in response to determining that the designated setup user interface portion is not implemented, searching for a compatible setup user interface portion; and in response to determining that the designated or compatible setup user interface portion is implemented, controlling the display section to display the designated or compatible setup user interface portion.

24 Claims, 9 Drawing Sheets

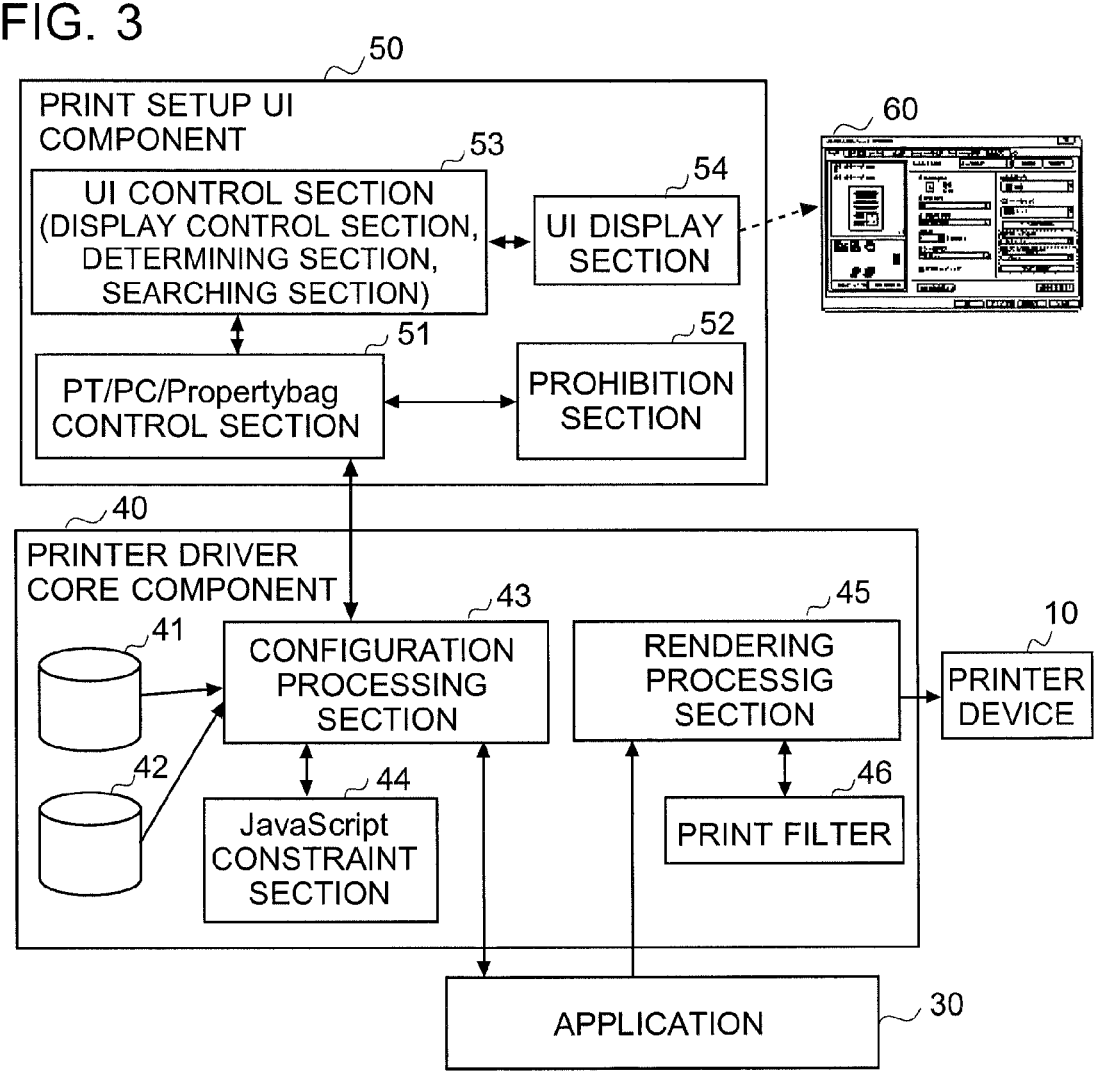

FIG. 4

```
*GPDFileName:"v4xxx.GPD"
*GPDFileVersion:"1.0"
*GPDSpecVersion:"1.0"
*Include:    "msxpsinc.gpd"
*ModelName:   "v4xxx Driver"
*MasterUnits: PAIR(1200,1200)
*PrinterType: PAGE
*MaxCopies:   999

*Feature: Orientation
{
   *rcNameID: =ORIENTATION_DISPLAY
   *DefaultOption: PORTRAIT
   *Option: PORTRAIT
   {
      *rcNameID: =PORTRAIT_DISPLAY
   }
   *Option: LANDSCAPE_CC90
   {
      *rcNameID: LANDSCAPE_DISPLAY
   }
}
*Feature: PaperSize
{
   *rcNameID: =PAPER_SIZE_DISPLAY
   *DefaultOption: LETTER
   *Option: A4
   {
      *rcNameID: RCID_DMPAPER_SYSTEM_NAME
      *PrintableArea: PAIR(9520,13630)
      *PrintableOrigin: PAIR(200,200)
   }
   *Option: LETTER
   {
      *rcNameID: RCID_DMPAPER_SYSTEM_NAME
      *PrintableArea: PAIR(9800,12800)
      *PrintableOrigin: PAIR(200,200)
   }
}
*Feature: Stapling
{
   *rcNameID: =STAPLE_DISPLAY
   *DefaultOption: Off

*Option: Off
   {
      *rcNameID: =STAPLE_OFF_DISPLAY
   }

*Option: StapleTopLeft
   {
      *rcNameID: STAPLE_1LEFT_DISPLAY
   }
}
              ⋮
```

```
<UITypeSettings>
   FeatureX: Type2
</UITypeSettings>

<UITypeCompatibility>
   FeatureX: Type2,Type1
   FeatureX: Type3,#NotShow#
</UITypeCompatibility>
```

FIG. 7

☑ STAPLE

FIG. 8

STAPLE

| OFF | ⌄ |

OFF
LEFT 1POINT
LEFT 2POINTS
TOP 2POINTS

FIG. 9

☑ STAPLE

LEFT 1POINT ⌄

LEFT 1POINT
LEFT 2POINTS
TOP 2POINTS

FIG. 13

```
<UITypeSettings>
    Staple: Type1
</UITypeSettings>

<UITypeCompatibility>
    Staple: Type1
</UITypeCompatibility>
```

FIG. 14

```
<UITypeSettings>
    Staple: Type2
</UITypeSettings>

<UITypeCompatibility>
    Staple: Type2,Type1
</UITypeCompatibility>
```

FIG. 15

```
<UITypeSettings>
    Staple: Type3
</UITypeSettings>

<UITypeCompatibility>
    Staple: Type2,Type1
    Staple: Type3,#NotShow#
</UITypeCompatibility>
```

FIG. 16
|  |  | PRINTER DRIVER CORE COMPONENT | | |
|---|---|---|---|---|
|  |  | Ver.1 | Ver.2 | Ver.3 |
| PRINT SETUP UI COMPONENT | Ver.1 | #1 | #1 | #4 |
| | Ver.2 | #1 | #2 | #4 |
| | Ver.3 | #1 | #2 | #3 |
FIG. 17
DISPLAY EXAMPLE OF SETUP UI PORTION #1
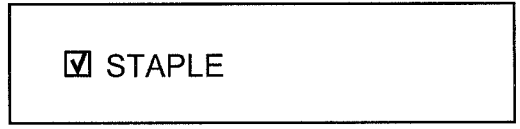
FIG. 18
DISPLAY EXAMPLE OF SETUP UI PORTION #2
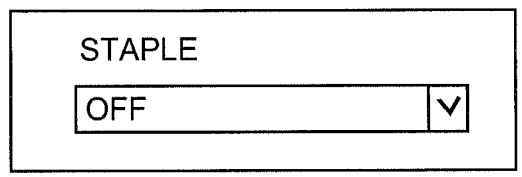
FIG. 19
DISPLAY EXAMPLE OF SETUP UI PORTION #3
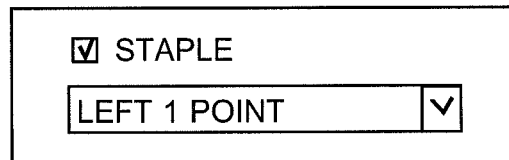
FIG. 20
DISPLAY EXAMPLE OF SETUP UI PORTION #4
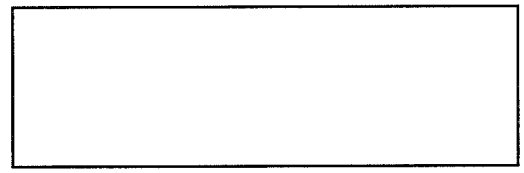

NON-TRANSITORY COMPUTER-READABLE STORAGE MEDIUM, COMPUTING DEVICE, AND DISPLAY METHOD OF USER INTERFACE OF PRINTER DRIVER

This application is based on Japanese Patent Application No. 2014-096484 filed on May 8, 2014, in the Japan Patent Office, the entire content of which is hereby incorporated by reference.

TECHNICAL FIELD

The present invention relates to a non-transitory computer-readable storage medium storing a printer driver therein, a computing device, and a display method of a user interface of the printer driver. In particular, the present invention relates to a non-transitory computer-readable storage medium storing a version 4 printer driver which is capable of running on Windows operating systems (WINDOWS is a registered trademark of Microsoft Corporation in the United States and other countries, and the same shall apply hereinafter), a computing device on which the printer driver is executed, and a display method of a user interface of the printer driver.

BACKGROUND

With regard to printer drivers which are capable of running on Windows operating systems, Microsoft corporation (MICROSOFT is a registered trademark of Microsoft Corporation in the United States and other countries, and the same shall apply hereinafter) provides guidelines for hardware manufacturers. According to the guidelines, hardware manufacturers have provided version 3 printer drivers on the assumption the printer drivers work with Windows operating systems from Windows 2000 to Windows 7.

As the succeeding operating systems, there arrived Windows 8 and Windows Server 2012. Especially, since Windows 8 employs a metro-style user interface, which is a new and tile-like user interface, hardware manufacturers are developing version 4 printer drivers which employ a new printer driver architecture for those operating systems.

Such a version 4 printer driver model has a structure roughly divided into two layers of a printer driver core component and a print setup UI (User Interface) component. These two layers are designed so as to separate their processes from each other, which realizes that the two layers can be provided separately.

The printer driver core component is an application which supplies print features. The printer driver core component includes a configuration file, such as a GPD (Generic Printer Description) and PPD (PostScript Printer Description) file, a print filter, and various modules including a JavaScript constraint section (JAVASCRIPT is a registered trademark of Oracle America, Inc.). The configuration file defines various print features. The printer filter edits rendering commands in rendering processing. The JavaScript constraint section handles a conflict among setup items about the print features.

The print setup UI component is an application being independent from the printer driver core component, and provides a setup user interface by using print capability information referred to as PrintCapabilities and print setup information referred to as PrintTicket, which are supplied from the printer driver core component.

As described above, as for a version 4 printer driver, the printer driver core component and the print setup UI component are provided separately, which sometimes causes a situation that the version of the printer driver core component does not match that of the print setup UI component. If a user obtains the printer driver core component and the print setup UI component through different distribution channels, for example a user obtains the printer driver core component through a CD or the Web and the print setup UI component through the Windows Store, there is a strong probability that these components are different in version and the components can be incompatible with each other.

With respect to a technology about a printer driver compatibility, though it is not a technology about the above-described version 4 printer driver, Japanese Unexamined Patent Publication (JP-A) No. 2013-175080 discloses the following technology to check a compatibility between a printer driver and a firmware of a printer device on the basis of their versions, and to display information that print processing is not conducted and information of the version of a printer driver which is compatible with the firmware if they have no compatibility. JP-A No. 2008-204169 discloses a technology that a printer driver obtains the version of a firmware of a printer device, determines whether the printer device can perform print processing, and cancels the print processing on determining that the printer device cannot perform the print processing. JP-A No. 2005-302031 discloses a technology that a printer driver obtains configuration data from a printer device, stores the configuration data in a non-volatile memory device, and generates a GUI (Graphical User Interface) on the basis of the configuration data.

A setup user interface displayed by a printer driver can include various kinds of setup UI (user interface) portions associated with different print features, for example for a MFP (Multi-Function Peripheral) and a printer. In such setup UI portions, setup UI portions being compatible with others and setup UI portions being incompatible with others may be mixed together. For example, under the assumption that there are three kinds of setup UI portions of MFP_V1, MFP_V2 and Printer, there can be a situation that MFP_V1 is compatible with MFP_V2, but Printer is not compatible with MFP_V1 and MFP_V2.

In such a printer driver, the printer driver core component designates a setup UI portion for each of print features and the print setup UI component causes a display unit to display setup UI portions according to the designation. Therefore, under the condition that the version of the printer driver core component is newer than that of the print setup UI component and that a setup UI portion designated by the printer driver core component is not implemented in the print setup UI component, the designated setup UI portion may not be displayed.

Thus, the print setup UI component may be designed to cause a display unit to display setup UI portions implemented in itself unconditionally. However, if a designated setup UI portion is not compatible with setup UI portions implemented in the print setup UI component, this handling method does not allow a user to setup a print feature associated with the designated setup UI portion.

SUMMARY

There are disclosed illustrative non-transitory computer-readable storage media each storing a printer driver, illustrative computing devices, and illustrative display methods of a user interface of the printer driver.

An illustrative non-transitory computer-readable storage medium reflecting one aspect of the present invention stores a printer driver to be executed in a computing device which gives print instructions to a printer device. The printer driver includes a printer driver core component and a setup user interface component being separated from the printer driver core component. The printer driver, when being executed by a processor of the computing device, causes the computing device to perform processing comprising: supplying, via the printer driver core component, information associated with a print feature or print features of the printer device; and controlling, via the print setup user interface component, a display section of the computing device to display one or more setup user interface portions on a basis of the information obtained from the printer driver core component, where each of the one or more setup user interface portions allows a user to setup a print feature of the printer device. The controlling the display section to display the one or more setup user interface portions includes, obtaining designation information which designates the one or more setup user interface portions, from the printer driver core component; and determining whether a designated setup user interface portion which is designated by the designation information is implemented in the print setup user interface component. The controlling the display section to display the one or more setup user interface portions further includes, in response to determining that the designated setup user interface portion is not implemented in the print setup user interface component, searching for a compatible setup user interface portion which is compatible with the designated setup user interface portion, by referring to compatibility information obtained in advance, to determine whether the compatible setup user interface portion is implemented in the print setup user interface component. The controlling the display section to display the one or more setup user interface portions further includes, in response to determining that the designated setup user interface portion or the compatible setup user interface portion is implemented in the print setup user interface component, controlling the display section to display the designated setup user interface portion or the compatible setup user interface portion.

An illustrative computing device reflecting one aspect of the present invention is a computing device communicable with a printer device through a communication network. The computing device comprises: a display section; a printer driver core section that supplies information associated with a print feature or print features of the printer device; and a print setup user interface section that is separate from the printer driver core section and controls the display section to display one or more setup user interface portions on a basis of the information obtained from the printer driver core section, where each of the one or more setup user interface portions allows a user to setup a print feature of the printer device. The print setup user interface section includes a determining section that, using designation information which designates the one or more setup user interface portions and is obtained from the printer driver core section, determines whether a designated setup user interface portion which is designated by the designation information is implemented in the print setup user interface section. The print setup user interface section further includes a searching section that, in response to the determining section determining that the designated setup user interface portion is not implemented in the print setup user interface section, searches for a compatible setup user interface portion which is compatible with the designated setup user interface portion, by referring to compatibility information obtained in advance, to determine whether the compatible setup user interface portion is implemented in the print setup user interface section. The print setup user interface section further includes a display control section that, in response to the determining section determining that the designated setup user interface portion in the print setup user interface section, or the searching section determining that the compatible setup user interface portion is implemented in the print setup user interface section, controls the display section to display the designated setup user interface portion or the compatible setup user interface portion.

An illustrative method reflecting one aspect of the present invention is a display method of a user interface of a printer driver to be executed in a computing device which gives print instructions to a printer device. The printer driver including a printer driver core component and a setup user interface component being separated from the printer driver core component. The printer driver core component causes the computing device to supply information associated with a print feature or print features of the printer device. The print setup user interface component causes the computing device to control a display section of the computing device to display one or more setup user interface portions on a basis of the information obtained from the printer driver core component, where each of the one or more setup user interface portions allows a user to setup a print feature of the printer device. The method comprises: obtaining designation information which designates the one or more setup user interface portions, from the printer driver core component, and determining whether a designated setup user interface portion which is designated by the designation information is implemented in the print setup user interface component. The method further comprises, in response to determining that the designated setup user interface portion is not implemented in the print setup user interface component, searching for a compatible setup user interface portion which is compatible with the designated setup user interface portion, by referring to compatibility information obtained in advance, to determine whether the compatible setup user interface portion is implemented in the print setup user interface component.

The method further comprises, in response to determining that the designated setup user interface portion or the compatible setup user interface portion is implemented in the print setup user interface component, controlling the display section to display the designated setup user interface portion or the compatible setup user interface portion.

Other features of illustrative embodiments will be described below.

BRIEF DESCRIPTION OF THE DRAWINGS

Embodiments will now be described, by way of example only, with reference to the accompanying drawings which are meant to be exemplary, not limiting, and wherein like elements numbered alike in several figures, in which:

FIG. 3 is a functional block diagram of a computing device relating to one embodiment of the present invention;

FIG. 4 illustrates an example of a GPD file relating to one embodiment of the present invention;

FIG. 7 illustrates an example of a setup UI portion for a staple feature (Staple Type 1) relating to one embodiment of the present invention;

FIG. 8 illustrates an example of a setup UI portion for a staple feature (Staple Type 2) relating to one embodiment of the present invention;

FIG. 9 illustrates an example of a setup UI portion for a staple feature (Staple Type 3) relating to one embodiment of the present invention;

FIG. 13 illustrates an example of DriverPropertybag implemented in a printer driver core component of version 1 relating to one embodiment of the present invention;

FIG. 14 illustrates an example of DriverPropertybag implemented in a printer driver core component of version 2 relating to one embodiment of the present invention;

FIG. 15 illustrates an example of DriverPropertybag implemented in a printer driver core component of version 3 relating to one embodiment of the present invention;

FIG. 16 illustrates an example of a setup UI portion provided for each of combinations of printer drive core components of various versions and print setup UI components of various versions, relating to one embodiment of the present invention;

FIG. 17 illustrates an example of a setup UI portion (#1) relating to one embodiment of the present invention;

FIG. 18 illustrates an example of a setup UI portion (#2) relating to one embodiment of the present invention;

FIG. 19 illustrates an example of a setup UI portion (#3) relating to one embodiment of the present invention;

FIG. 20 illustrates an example of a setup UI portion (#4) relating to one embodiment of the present invention.

DETAILED DESCRIPTION

Figure 1:
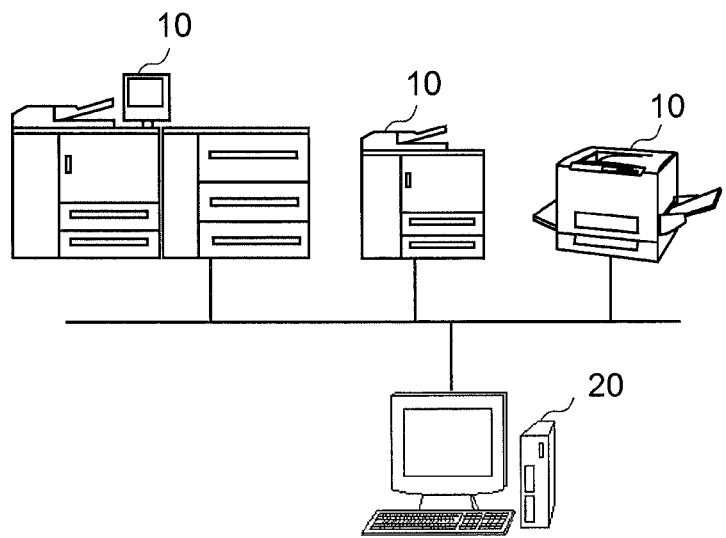
FIG. 1 is a diagram schematically illustrating a constitution of a printing system relating to one embodiment of the present invention.

Illustrative embodiments of non-transitory computer-readable storage media each storing a printer driver, computing devices, and display methods of a user interface will be described with reference to the drawings. It will be appreciated by those of ordinary skill in the art that the description given herein with respect to those figures is for exemplary purposes only and is not intended in any way to limit the scope of potential embodiments may be resolved by referring to the appended claims.

According to the non-transitory computer-readable storage media each storing a printer driver, computing devices, and display methods of a user interface of the printer driver as the illustrative embodiments, a user can setup print features even under condition that the printer driver core component and the print setup UI component are different in version, because of the following reason.

In the printer driver, a print setup user interface component, when being executed, causes a display section of a computing device to display one or more setup user interface portions for allowing a user to setup print features as follows. If a setup user interface portion designated by a designation information, which is obtained from a printer driver core component, is implemented in the print setup user interface component, the setup user interface component causes the display section to display the designated setup user interface portion. If the designated setup user interface portion is not implemented in the print setup user interface component, the setup user interface component causes the computing device to search for a setup user interface portion which is compatible with the designated setup user interface portion, on the basis of compatibility information obtained in advance. If a compatible setup user interface portion is implemented in the print setup user interface component, the print setup user interface component causes the display section to display the compatible setup user interface portion. If a compatible setup user interface portion is not implemented in the print setup user interface component, the print setup user interface component causes the display section to hide a setup user interface portion associated with the feature concerned (that is, the feature corresponding to the designated setup user interface portion).

As illustrated in the descriptions about the background, hardware manufactures provide printer drivers for Windows operating systems and are further developing version 4 printer drivers for new Windows operating systems such as Windows 8 and Windows Server 2012. Such a version 4 printer driver is composed of two layers as a printer driver core component and a print setup UI component. The relationship of the printer driver core component and the print setup UI component is described, for example, in "V4 Printer Driver White Paper."

According to "V4 Printer Driver White Paper", definition of print settings is conducted via the printer driver core component (such as a GPD/PPD file and JavaScript Constraints), and as a result, PrintTicket (print ticket information) and PrintCapabilities (print capability information) are created. An information exchange between the printer driver core component and the print setup UI component is conducted by using the PrintTicket, PrintCapabilities and DriverPropertybag.

As described above, in a version 4 printer driver, the printer driver core component and the print setup UI component are provided separately, which sometimes causes a case that the version of the printer driver core component does not match the version of the print setup UI component. Such a case can result in that a setup UI portion designated by the printer driver core component cannot be displayed. For example, under the condition that the version of a printer driver core component is newer than the version of the print setup UI component and that the setup UI portion designated by the printer driver core component is not implemented in the print setup UI component, the designated setup UI portion cannot be displayed. In order to handle the issue, the print setup UI component may cause a display section to display setup UI portions unconditionally. However, if a designated setup UI portion is not compatible with setup UI portions implemented in the print setup UI component, this handling method does not allow a user to setup a print feature associated with the designated setup UI portion.

The above-described situation newly arises from the feature of a version 4 printer driver that the printer driver core component and a print setup UI component are provide as separated layers. Since it is difficult to prepare the print setup UI component in consideration of the above-described incompatibility in advance (that is, the print setup UI component is not informed about which kind of setup UI portions will be designated by the newer version of printer driver core component, before it happens), developers of a version 4 printer driver is needed to offer a way to avoid the situation.

In view of that, there is provided an illustrative printer driver which causes, when being executed, a computing device to serve the function of a print setup UI section performing the following processing. The processing includes obtaining designation information which designates a setup UI portion associated with a print feature, from the printer driver core component, and then, determining whether a setup UI designated by the designation information is implemented in the print setup UI component. The processing further includes, in response to determining that the setup UI portion designated by the designation information is implemented in the print setup UI component, controlling a display section of the computing device to display the designated setup UI portion. The processing further includes, in response to determining that a setup UI portion associated with a certain feature is not implemented in the print setup UI component, searching the print setup UI component for a compatible (substitutable) setup UI portion which is compatible with the setup UI portion concerned while referring with compatibility information obtained in advance. The processing further includes, in response to determining that a compatible setup UI portion is implemented in the print setup UI component, controlling the display section to display the compatible setup UI portion; and in response to determining that a compatible setup UI portion is not implemented in the print setup UI component, controlling the display section to hide (or not to display) a setup UI portion associated with the feature corresponding to the designated setup UI portion.

According to the processing, even under the condition that the printer driver core component and the print setup UI component are different in version (especially, the version of the print setup UI component is older than that of the printer driver core component), a user can setup print features by using compatible setup UI portions. Additionally, by hiding a setup UI portion associated with a certain feature when a compatible setup UI portion is not implemented, user's erroneous setup operations about the feature can be avoided, before it happens.

EXAMPLE

Example 1

Figure 2:
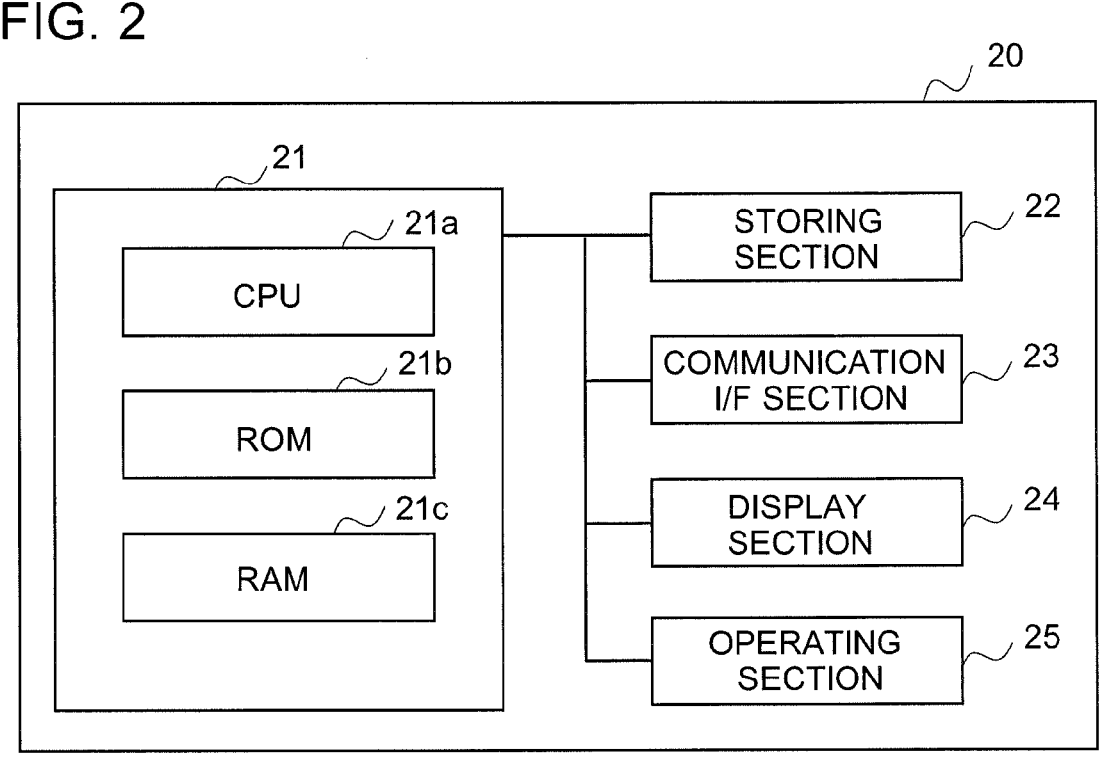
FIG. 2 is a block diagram illustrating a constitution of a computing device relating to one embodiment of the present invention.
Figures 5, 6:
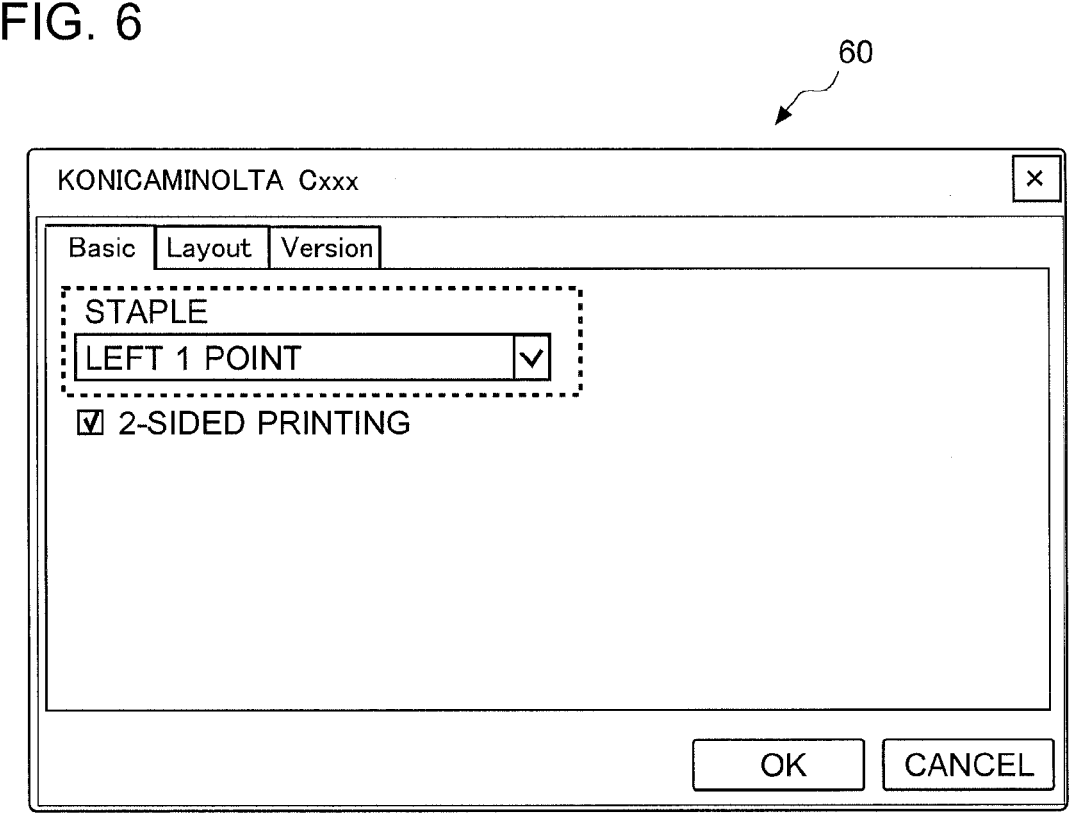
FIG. 5 illustrates an example of DriverPropertybag relating to one embodiment of the present invention.
FIG. 6 illustrates an example of a setup user UI relating to one embodiment of the present invention.
Figure 10:
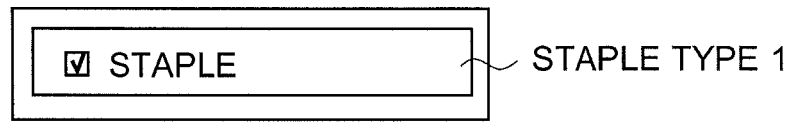
FIG. 10 illustrates an example of a setup UI portion implemented in a print setup UI component of version 1 relating to one embodiment of the present invention.
Figure 11:
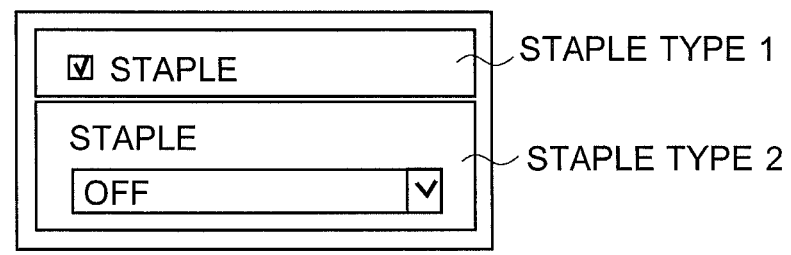
FIG. 11 illustrates an example of a setup UI portion implemented in a print setup UI component of version 2 relating to one embodiment of the present invention.
Figure 12:
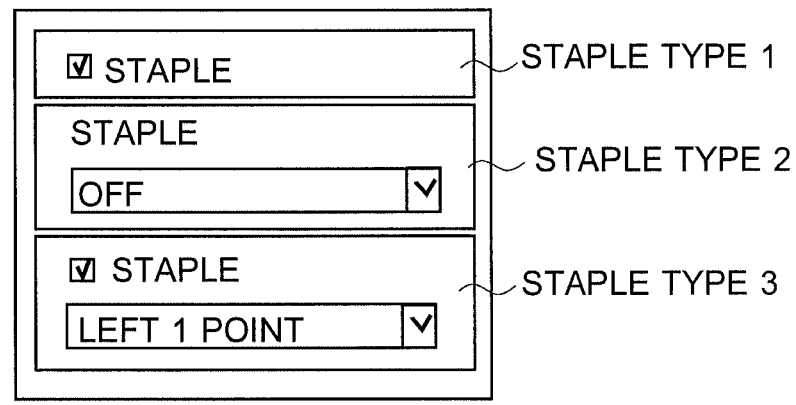
FIG. 12 illustrates an example of a setup UI portion implemented in a print setup UI component of version 3 relating to one embodiment of the present invention.
Figure 21:
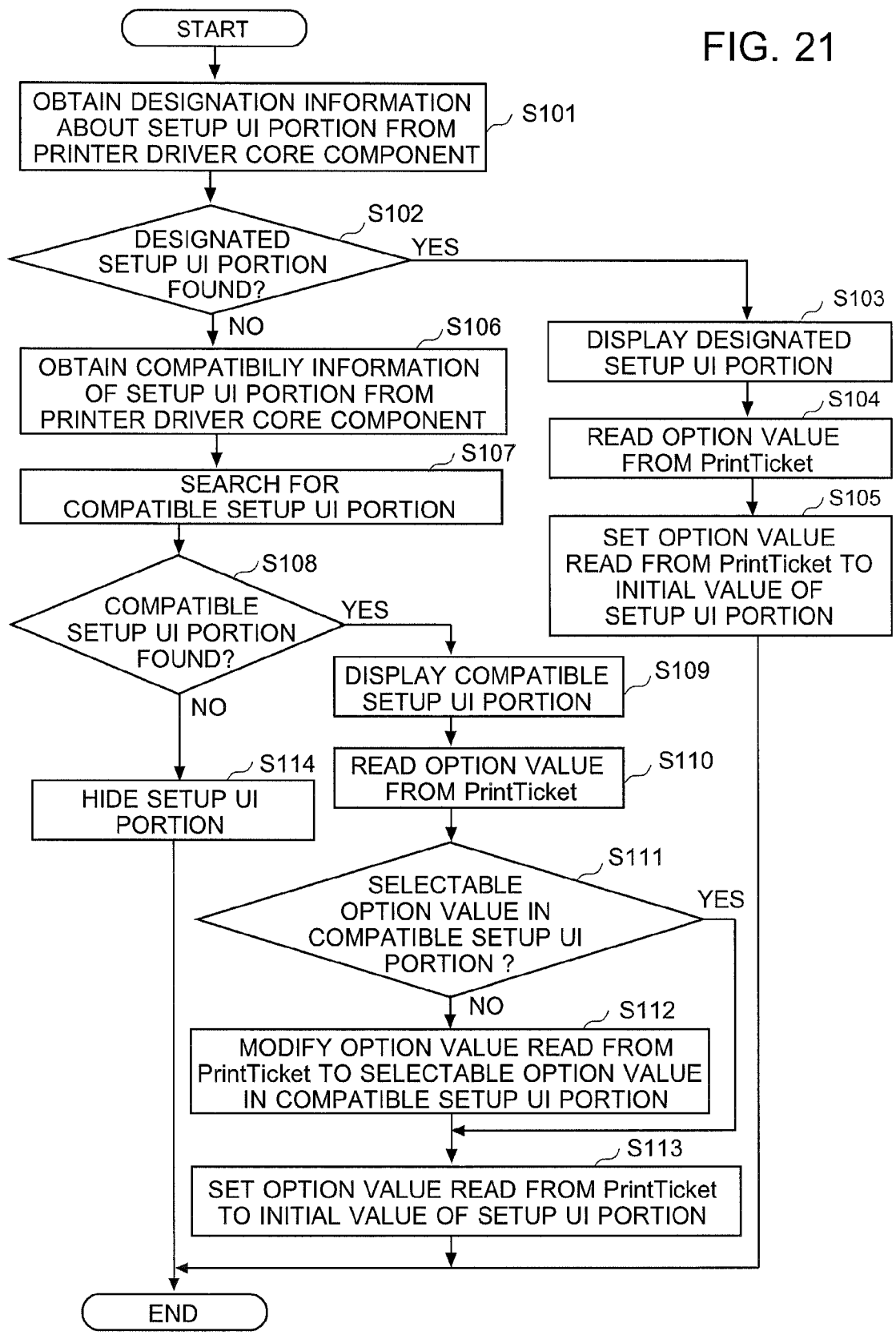
FIG. 21 is a flowchart illustrating processes of a printer driver relating to one embodiment of the present invention.

In order to describe the above-mentioned embodiments in more detail, description will be given to a non-transitory computer-readable storage media each storing a printer driver, computing devices, and display methods of a user interface of the printer driver pertaining to one example of the present invention with reference to FIGS. 1 to 21. FIG. 1 is a diagram schematically illustrating a constitution of a printing system of the present example. FIG. 2 is a block diagram illustrating a constitution of a computing device of the present example. FIG. 3 is a functional block diagram of a computing device of the present example. FIG. 4 illustrates an example of a GPD file. FIG. 5 illustrates an example of DriverPropertybag. FIG. 6 illustrates an example of a setup user UI. Each of FIGS. 7 to 9 illustrates an example of a setup UI portion for a staple function. Each of FIGS. 10 to 12 illustrates an example of a setup UI portion implemented in a print setup UI component. Each of FIGS. 13 to 15 illustrates an example of DriverPropertybag implemented in a printer driver core portion of the present example. FIG. 16 illustrates an example of a setup UI portion provided for each of combinations of printer drive core components of various versions and print setup UI components of various versions of the present example. Each of FIGS. 17 to 20 illustrates a display example of a setup UI portion of the present example. FIG. 21 is a flowchart illustrating processing of a printer driver of the present example.

As illustrated in FIG. 1, a printing system of the present example includes printer devices 10 which execute print processing according to print instructions, and a print instructing device (hereinafter, referred to as a computing device 20) which gives print instructions to the printer devices 10. The printer devices 10 and the computing device 20 are communicably connected together with a communication network such as a LAN (Local Area Network) and a WAN (Wide Area Network).

Printer devices 10 can be printers and MFPs (Multi-Function Peripherals) capable of printing documents in, for example, the XML (XML Paper Specification) form. Each of the printer devices 10 is configured to analyze print data sent from computing device 20, rasterize pieces of the print data corresponding to pages of a document to create image data for each of the pages, and print images based on the image data by using an image forming process such as an electrophotographic process and an electrostatic printing process.

Computing device 20 can be a personal computer or a mobile device (such as a smart phone and a tablet terminal) which supports a Microsoft Windows operating system. Computing device 20 includes control section 21, storing section 22, communication interface (I/F) section 23, display section 24, and operating section 25, as illustrated in FIG. 2.

Control section 21 includes a CPU (Central Processing Unit) 21a and storage devices such as a ROM (Read Only Memory) 21b and a RAM (Random Access Memory) 21c. CPU 21a reads various programs stored in ROM 21b or storing section 22, and then, develops and executes the programs on RAM 21c, where the various programs include programs for controlling operations of computing device 20, an operating system (in the present example, Microsoft Windows operating system on which a version 4 printer driver can be executed), application programs and printer drivers for controlling printer devices 10 (in the present example, a version 4 printer driver including a printer driver core component and a print setup UI component provided as separated layers, in other words, a version 4 printer driver for which a printer driver core component and a print setup UI component are separately provided). The application programs, the printer driver core component and the print setup UI component will be described later.

Storing section 22 includes a memory device, such as a HDD (Hard Disk Drive), and stores various data including programs, document data and print data.

Communication interface section 23 is composed of a device such as a NIC (Network Interface Card) and a modem, and is configured to perform data communication with printer devices 10 through a wireless network or a wired network.

Display section 24 includes a device such as a LCD (Liquid Crystal Display), and displays screens of application programs and a setup UI (an interface screen or window which allows a user to setup print features) implemented in the print setup UI component.

Operating section 25 includes devices such as a mouse, a keyboard and a touch sensor formed on display section 24, and allows a user to perform operations such as creating documents and setting print features of printer devices 10.

FIG. 3 is a block diagram illustrating functions and sections realized by control section 21 of computing device 20. Control section 21 of computing device 20 executes application programs 30, printer driver core component 40, and print setup UI component 50 to realize their functions.

Application program 30 is a program to be executed on an operating system (for example, Microsoft Office which can run on Windows operating systems) for creating document data to be printed.

Printer driver core component 40 is a program to be executed on an operating system, and when being executed, causes the control section 21 to serve as a printer driver core section which supplies information associated with print features of printer device 10 and sends a print instruction to printer device 10 in cooperation with application program 30 and print setup UI component 50. The printer driver core component 40 includes GPD file 41, DriverPropertybag (driver property bag) 42, configuration processing section 43, JavaScript constraint section 44, rendering processing section 45 and print filter 46, and when being executed, causes the control section 21 to serve their functions.

GPD file 41 is one of configuration files and includes definition of various print features of printer device 10. DriverPropertybag 42 is a region for storing vendor specific data. For example, DriverPropertybag 42 includes definition of UITypeSettings being designation information of setup UI portions and definition of UITypeCompatibility being compatibility information of setup UI portions so as to be referred from various modules of the printer driver core component 40 and print setup UI component 50. Configuration processing section 43 performs the following processing. Configuration processing section 43 creates PrintCapabilities (print capability information) based on GPD file 41, where PrintCapabilities includes descriptions of setup items associated with the print features which can be set by users and descriptions of option values available for each setup item associated with the printing features and both descriptions are described in the XML format. Configuration processing section 43 further creates PrintTicket (print setup information) which includes descriptions of an option value for each setup item, chosen by a user from among the option values described in PrintCapabilities, and invokes JavaScript constraint section 44.

JavaScript constraint section 44 processes PrintTicket and/or PrintCapabilities to handle a conflict among setup items of the print features. For example, under the situation that a combination of a setting of a first feature (for example, an imposition feature) and a setting of a second feature (for example, a punching feature) is invalid, JavaScript constraint section 44 modifies one of the settings to be consistent with the other. Rendering processing section 45 converts print instructions sent from application program 30 into descriptions in language which can be interpreted by printer device 10. Print filter 46 edits instructions for drawing and edits print control commands, in a rendering process.

Print setup UI component 50 is a program to be executed on an operating system and when being executed, causes the control section 21 to serve as a print setup UI section. Print setup UI component 50 includes PT/PC/Propertybag control section 51, prohibition section 52, UI control section 53, and UI display section 54, and when being executed, causes the control section 21 to serve their functions. In the print setup UI component 50 (the print setup UI section), setup UI portions for various features (UI information about a setup item corresponding to each of various features) are implemented. Thereby, when being executed, the print setup UI component 50 is capable of causing display section 24 to display one or plural setup UI portions which allow a user to setup various print features, on the basis of information obtained from printer driver core component.

PT/PC/Propertybag control section 51 processes (or interprets) PrintTicket, PrintCapabilities, and DriverPropertybag obtained from printer driver core component 40 (printer driver core section), and notifies print capability information, print setup information, designation information about a setup UI portion, and compatibility information, to UI control section 53. Prohibition section 52 determines whether there is an invalid combination of print settings (such as constraint violation and erroneous print settings). UI control section 53 controls the entire sections of print setup UI component 50. UI display section 54 controls display section 24 to display setup screen 60 (a user interface) including setup UI portions which are associated with various features and notified by UI control section 53, and applies setup values notified by the UI control section 53 onto the setup UI portions.

Concretely, the UI control section 53 acts as a display control section which controls UI display section 54 so as to cause display section 24 to display setup UI portions and also works as a determining section and a searching section. The determining section determines whether a setup UI portion designated by designation information, which has been interpreted by PT/PC/Propertybag control section 51 (for example, designation information obtained in such a way that PT/PC/Propertybag control section 51 obtains DriverPropertybag 42 from printer driver core component 40 and then interprets the DriverPropertybag 42), is implemented in the print setup UI component 50 (print setup UI section). If the designated setup UI portion is implemented in the print setup UI component 50 (print setup UI section), the display control section notifies the designated setup UI portion to the UI display section 54 and controls display section 24 to display the designated setup UI portion. If the designated setup UI portion is not implemented, the search section obtains compatibility information, which has been interpreted by PT/PC/Propertybag control section 51, in advance, and searches for a compatible setup UI portion which is compatible with the designated setup UI portion, by referring to the compatibility information. If a compatible setup UI portion is implemented in the print setup UI component 50 (print setup UI section), the display control section notifies the compatible setup UI portions to the UI display section 54 and controls display section 24 to display the compatible setup UI portion. If no compatible setup UI portion is implemented in the print setup UI component 50 (print setup UI section), the display control section notifies to UI display section 54 that the setup UI portions should be hidden and controls display section 24 to hide the setup UI portion (as occasion demands, controls display section 24 to display information that the setup UI portion cannot be displayed because the printer driver core component and the print setup UI component are different in version). If a compatible setup UI portion is implemented in the print setup UI component 50 (print setup UI section), prohibition section 52 determines whether a setup option value designated by PrintTicket is selectable on the compatible setup UI portion (whether invalid setting will occur). If prohibition section 52 has determined that invalid setting will occur, prohibition section 52 modifies the setup option value to another value which does not make invalid setting (in other words, modifies the setup option value to a setup option value which is selectable on the compatible setup UI portion).

The present example uses DriverPropertybag that stores compatibility information of setup UI portions therein, but the compatibility information is not necessary to be stored in the DriverPropertybag. For example, compatibility information may be stored in an arbitrary region, such as storing section 22 of computing device 20, which can be referred from the printer driver core component 40 (printer driver core section) and print setup UI component 50 (print setup UI section). Further, in the present example, there will be given a description that GPD file 41 is used as a configuration file to define print features. Alternatively, the display method of a user interface of the printer drive of the present example is applicable similarly to the situation that a PPD file is used as the configuration file.

Hereinafter, the way to display setup UI portions will be descried in more detail with reference to a concrete example of the data description of GPD file 41 and DriverPropertybag 42.

FIG. 4 illustrates an example of a description of GPD file 41. In GPD file 41, each print feature is defined at "*Feature:" shown in FIG. 4, and an option value of each print feature are defined at "*Option:", as a child element of the "*Feature". In this example, the GPD file 41 includes definition of print features: "Orientation" (page orientation), "PaperSize" (paper size), and "Stapling" (staple), and further includes definition of setup portion values of print features: LANDSCAPE (landscape or horizontal orientation) for Orientation, LETTER for PaperSize, and StapleTopLeft (stapling sheets at the top left corner) for Stapling.

FIG. 5 illustrates an example of a description of DriverPropertybag 42. DriverPropertybag 42 of the present example, includes definition of UITypeSettings which is designation information of a setup UI portion, and definition of UITypeCompatibility which is compatibility information. UITypeSettings defines designation information of a setup UI portion for each of print features. In the present example, the designation information includes an instruction to display the print feature FeatureX by using the setup UI portion Type 2. UITypeCompatibility defines compatibility information of setup UI portions for each of the print features. In the present example, the compatibility information represents compatibility about setup UI portions associated with the print feature FeatureX. The compatibility information is capable of defining a plurality of compatible setup UI portions for one print feature. If a setup UI portion designated by the designation information is not implemented in the print setup UI component, the search section searches for the compatible setup UI portions in order according to a predetermined priority.

Concretely, "FeatureX: Type2, Type 1" in FIG. 5 represents that the setup UI portion of Type2 and the setup UI portion of Type 1 are compatible with each other, with respect to setup UI portions associated with the print feature FeatureX. It means that, if, for example, Type2 is designated for a setup UI portion by UITypeSettings under the condition that the setup UI portion of Type 2 is not implemented in print setup UI component 50, the setup UI portion of Type 1 which is compatible with the setup UI portion of Type 2 is displayed. The search section searches for compatible setup UI portions, in order from left to right, starting at the value designated right after ":" in UITypeSettings, so as to find a setup UI portion implemented in the print setup UI component 50. As another example, "FeatureX: Type3, #NotShow#" in FIG. 5 represents that there is no setup UI portion being compatible with the setup UI portion of Type 3 with respect to setup UI portions associated with the print feature FeatureX. It means that, under the condition that the setup UI portion of Type 3 is not implemented in print setup UI component 50, a setup UI portion associated with the print feature FeatureX is hidden.

FIG. 6 illustrates an example of setup screen 60 (a user interface) displayed on display section 24 by UI display section 24. On the setup screen 60, setup UI portions associated with various features whose option values is set on the basis of UITypeSettings in DriverPropertybag 42 (or setup UI portions associated with various features searched on the basis of UITypeCompatibility) are displayed. Each setup UI portion indicates the setup item and its setup option value which are set on the basis of PrintCapabilities (print capability information) and PrintTicket (print setup information of print settings). In the present example, the setup screen 60 displays setup UI portions for just two print features of a staple feature and a feature of two or one sided printing, for ease of description, but the setup screen 60 can display arbitrary setup UI portions associated with various features relating to print processing. Hereinafter, there will be given descriptions about a setup UI portion for a staple feature, which is boxed by a broken line in FIG. 6, with reference to FIGS. 7 to 20.

FIGS. 7 to 9 illustrate various display examples of a setup UI portions for a staple feature. Concretely, FIG. 7 illustrates a display examples of setup UI portion "Staple Type 1" which is one of display modes of a setup UI portion for a staple feature. The "Staple Type 1" indicates the staple feature by using a check box so as to allow a user to switch between setup option values "Off" and "Left one point". That is, user's operation to check the check box sets the setup option value of the staple feature to "Left one point" which has been configured in advance, and user's operation to check the check box sets the setup option value of the staple feature to "Off".

FIG. 8 illustrates a display examples of setup UI portion "Staple Type 2" which is another of display modes of a setup UI portion for the staple feature. The "Staple Type 2" indicates the staple feature by using a combo box which selectably shows plural options so as to allow a user to switch between the plural option values "Off", "Left one point", "Left two points", and "Top two points".

FIG. 9 illustrates a display examples of setup UI portion "Staple Type 3" which is another of display modes of the setup UI portion for the staple feature. The "Staple Type 3" indicates the staple feature by using the check box illustrated in FIG. 7 and the combo box illustrated in FIG. 8. On the check box, a user is allowed to switch between the option values "Off" and "On". Selecting "On" on the check box (user's operation to check the check box) activates the combo box so as to allow a user to switch between the option values "Off", "Left one point", "Left two points", and "Top two points".

As described by using UITypeCompatibility in DriverPropertybag 42 shown in FIG. 5, the setup UI portion "Staple Type 1" in FIG. 7 is compatible with the setup UI portion "Staple Type 2" in FIG. 8, but the setup UI portion "Staple Type 3" in FIG. 9 is not compatible with the other setup UI portions because the setup UI portion "Staple Type 3" uses a combination of plural display modes, which are a check box and a combo box. Accordingly, it is necessary to select a setup UI portion to be displayed on the setup screen 60 properly in accordance with a combination of designation of UITypeSettings implemented in printer driver core component 40 and a setup UI portion implemented in print setup UI component 50.

Hereinafter, there will be given a concrete description about which of the setup UI portions should be displayed on the display section 24 under the condition that the following setup UI portion is implemented in print setup UI component 50 of one of various versions of and the following DriverPropertybag 42 is implemented in printer driver core component 40 of one of various versions. In the following description, it is assumed that there are three types of setup UI portions for a staple feature: "Staple Type 1", "Staple Type 2", and "Staple Type 3", and that "Staple Type 1" is compatible with "Staple Type 2", and "Staple Type 3" is not compatible with the other setup UI portions.

FIGS. 10 to 12 illustrate examples of setup UI portions for a staple feature, which are implemented in various versions of print setup UI component 50 of a version 4 printer driver. Concretely, FIG. 10 illustrates an example of a setup UI portion for a staple feature, which is implemented in print setup UI component 50 of version 1. In the print setup UI component 50 of version 1, just the setup UI portion "Staple Type 1" is implemented with respect to the staple feature. FIG. 11 illustrates an example of setup UI portions for a staple feature, which are implemented in print setup UI component 50 of version 2. In the print setup UI component 50 of version 2, two types of setup UI portions "Staple Type 1" and "Staple Type 2" are implemented with respect to the staple feature. FIG. 12 illustrates an example of setup UI portions for a staple feature, which are implemented in print setup UI component 50 of version 3. In the print setup UI component 50 of version 3, three types of setup UI portions "Staple Type 1", "Staple Type 2" and "Staple Type 3" are implemented with respect to the staple feature.

FIGS. 13 to 15 illustrate examples of DriverPropertybag 42, which are implemented in various versions of printer driver core component 40 of a version 4 printer driver. Concretely, FIG. 13 illustrates an example of DriverPropertybag 42 in printer driver core component 40 of version 1. The DriverPropertybag 42 includes a description of UITypeSettings designating the setup UI portion Type 1 with respect to a staple feature. FIG. 14 illustrates an example of DriverPropertybag 42 in printer driver core component 40 of version 2. The DriverPropertybag 42 includes a description of UITypeSettings designating the setup UI portion Type 2 with respect to a staple feature, and further includes a description of UITypeCompatibility designating the setup UI portion Type 1 as a compatible setup UI portion which is compatible with the setup UI portion Type 2 with respect to the staple feature. FIG. 15 illustrates an example of DriverPropertybag 42 in printer driver core component 40 of version 3. The DriverPropertybag 42 includes a description of UITypeSettings designating the setup UI portion Type 3 with respect to a staple feature, and further includes a description of UITypeCompatibility designating "NotShow" (a hidden setup UI portion) as a compatible setup UI portion which is compatible with the setup UI portion Type 3 with respect to the staple feature.

FIG. 16 illustrates an example of a setup UI portion provided for each of combinations of printer drive core components 40 of various versions and print setup UI components 50 of various versions. In FIG. 16, #1 to #4 correspond to setup UI portions illustrated in FIGS. 17 to 20, respectively.

For example, in case that print setup UI components 50 of each of versions 1 to 3 is combined with printer driver core component 40 of version 1, the staple feature is indicated by using the setup UI portion "Staple Type 1" as illustrated in FIG. 17. It is because the setup UI portion "Staple Type 1" designated by UITypeSettings in DriverPropertybag 42 in the printer driver core component 40, is implemented in print setup UI component 50 of every version.

As another example, in case that print setup UI component 50 of version 1 is combined with printer driver core component 40 of version 2, the staple feature is indicated by using the setup UI portion "Staple Type 1" (see FIG. 17), which is compatible with the setup UI portion "Staple Type 2", according to UITypeCompatibility. It is because the setup UI portion "Staple Type 2" designated by UITypeSettings in DriverPropertybag 42 in the printer driver core component 40, is not implemented in the print setup UI component 50. In case that print setup UI component 50 of each of versions 2 and 3 is combined with printer driver core component 40 of version 2, the staple feature is indicated by using the setup UI portion "Staple Type 2" as illustrated in FIG. 18. It is because the setup UI portion "Staple Type 2" designated by UITypeSettings in DriverPropertybag 42 in the printer driver core component 40, is implemented in the print setup UI component 50.

In case that print setup UI component 50 of each of versions 1 and 2 is combined with printer driver core component 40 of version 3, a setup UI is hidden (see FIG. 20) according to UITypeCompatibility. It is because the setup UI portion "Staple Type 3" designated by UITypeSettings in DriverPropertybag 42 in the printer driver core component 40, is not implemented in the print setup UI component 50. In case that print setup UI component 50 of version 3 is combined with printer driver core component 40 of version 3, the staple feature is indicated by using the setup UI portion "Staple Type 3" as illustrated in FIG. 19. It is because the setup UI portion "Staple Type 3" designated by UITypeSettings in DriverPropertybag 42 in the printer driver core component 40, is implemented in print setup UI component 50 of every version.

Hereinafter, processing of a printer driver (processing caused by print setup UI component 50) of the present example will be described with reference to the flowchart illustrated in FIG. 21. CPU 21a expands the printer driver (print setup UI component) stored in ROM 21b or storing section 22 onto RAM 21c and executes it, to perform the processes shown in the flowchart of FIG. 21. The following description will be given under the assumption that a setup UI portion relating to one feature is displayed on a setup screen.

First, PT/PC/Propertybag control section 51 interprets DriverPropertybag (UITypeSettings) obtained from printer driver core component 40, to obtain designation information about a setup screen (a setup UI portion) (S101). UI control section 53 (the determining section) determines whether a setup UI portion designated by the designation information is implemented in print setup UI component 50 (S102).

If the UI control section 53 (the determining section) has determined that the setup UI portion designated by the designation information is implemented in print setup UI component 50 (YES in S102), UI control section 53 (display control section) notifies the designated setup UI portion to UI display section 54, and the UI display section 54 controls display section 24 to display the designated setup UI portion (S103). This step corresponds to, in the example of FIG. 16, the case that the version of print setup UI component 50 is equal to or newer than the version of printer driver core component 40. Next, PT/PC/Propertybag control section 51 interprets PrintTicket obtained from printer driver core component 40 and reads a setup option value (S104). UI control section 53 (display control section) sets the setup option value obtained from the PrintTicket as the initial value of the setup UI portion and UI display section 54 causes the setup UI portion to indicate the initial value which has been set (S105).

On the other hand, if the UI control section 53 (the determining section) has determined that the setup UI portion designated by the designation information is not implemented in print setup UI component 50 (NO in S102), PT/PC/Propertybag control section 51 interprets DriverPropertybag (UITypeCompatibility) obtained from printer driver core component 40, to obtain compatibility information (a setup UI portion) (S106). UI control section 53 (the searching section) searches for a compatible setup UI portion, which is compatible with the setup UI portion designated by the designation information, while referring to the compatibility information and determining that a compatible setup UI portion is implemented in print setup UI component 50 (S107). If the compatibility information includes designation of plural setup UI portions which are compatible with the designated setup UI portion for one print feature, UI control section 53 (searching section) searches for the plural compatible setup UI portions in order according to a predetermined priority.

If the UI control section 53 (the searching section) has determined that a compatible setup UI portion is implemented in print setup UI component 50 (YES in S108), UI control section 53 (display control section) notifies the compatible setup UI portion, which has been found in the searching process, to UI display section 54, and the UI display section 54 operates display section 24 to display the notified compatible setup UI portion (S109). This step corresponds to, in the example of FIG. 16, the case that the version of printer driver core component 40 is version 2 and the version of print setup UI component 50 is version 1 (see the pale-shaded area in FIG. 16). Next, PT/PC/Propertybag control section 51 interprets PrintTicket obtained from printer driver core component 40 and reads a setup option value (S110). Prohibition section 52 determines whether the setup option value obtained from PrintTicket is a value which is selectable in the compatible setup UI portion (S111). If the prohibition section 52 has determined that the setup option value obtained from the PrintTicket is not selectable on the compatible setup UI portion, prohibition section 52 modifies the setup option value to another setup option value which is selectable on the compatible setup UI portion (S112). After that, UI control section 53 (display control section) sets the setup option value obtained from PrintTicket (or the modified setup option value) as the initial value of the compatible setup UI portion, and UI display section 54 causes the setup UI portion to indicate the initial value which has been set (S113).

If the UI control section 53 (the determining section) has determined that a compatible setup UI portion is not implemented in print setup UI component 50 or if it is found that the designated setup UI portion is designated to be hidden (NO in S108), the UI control section 53 (display control section) notifies to UI display section 54 so as to hide a setup UI portion (S114). This step corresponds to, in the example of FIG. 16, the case that the version of printer driver core component 40 is version 3 and the version of print setup UI component 50 is version 1 or 2 (see the deep-shaded area in FIG. 16).

The above-described flow shows an example that under the condition that a setup UI portion which is compatible with another setup UI portion with respect to a certain function is not implemented in print setup UI component 50, a setup UI portion associated with the function is hidden (that is, setup UI portions associated with other functions are displayed). Alternatively, under the above condition, UI display section 54 may operate the display section 24 to display information that a setup UI portion is not displayed because printer driver core component 40 and print setup UI component are different in version. Further, under the condition that, with respect to a part of features, a designated or compatible UI portion is not implemented in print setup UI component 50, the UI display section 54 may operate the display section 24 to hide all the contents of the setup screen.

As described above, the print setup UI component 50, when being executed, causes the control section 21 to serve as the UI control section 53 as follows, under the condition that a setup UI portion designated by UITypeSettings in DriverPropertybag 42 is not implemented in print setup UI component 50. The UI control section 53 searches for a compatible setup UI portion according to information of UITypeCompatibility. If a compatible setup UI portion is implemented in print setup UI component 50, the UI control section 53 controls display section 24 to display the compatible setup UI portion. If a compatible setup UI portion is not implemented in print setup UI component 50, the UI control section 53 controls display section 24 to hide a setup UI portion. Such a control can display setup UI portions onto a setup screen even under the condition that the printer driver core component 40 and print setup UI component 50 are different in version, and allows a user to setup print functions property.

The scope of the present invention is not limited to the aforementioned embodiments and examples. Disclosed configurations of the aforementioned printer driver and the disclosed display method of a user interface of the printer driver can be varied by a skilled person without departing from the spirit and scope of the invention.

For example, though the above-mentioned example illustrated version 4 printer driver such that a setup UI portion associated with a staple feature is displayed by using any one of "Staple Type 1", "Staple Type 2", "Staple Type 3", and a hidden setup UI portion, the display method of a user interface of the printer driver as an embodiment of the present invention can be applied to the situation that possible setup UI portions for a staple feature includes other types of setup UI portions. Further, though the above-mentioned example illustrated a case that the version of each of printer driver core component 40 and print setup UI component 50 is one of versions 1 to 3, the display method of a user interface of the printer driver as an embodiment of the present invention can be applied to another case that the version of each of printer driver core component 40 and print setup UI component 50 is version 4 or higher. Further, though the above-mentioned example illustrated about a version 4 printer driver, the display method of a user interface of the printer driver as an embodiment of the present invention can be applied to an arbitrary version of the printer driver for which a printer driver core component 40 and a print setup UI component 50 are separately provided.

Further, the above-mentioned example illustrated the printer driver such that, if a setup UI portion designated by printer driver core component 40 is not implemented in print setup UI component 50, the print setup UI component 50, when executed, causes the control section 21 to obtain compatibility information from the printer driver core component 40 and search for a setup UI portion which is compatible with the designated setup UI portion by referring to the compatibility information. However, there can be provided a printer driver such that the printer driver core component 40, when being executed, causes the control section 21 to obtain the version information from the print setup UI component 50 on a start-up process of the print setup UI component 50, and to designate a setup UI portion which can be displayed by the print setup UI component 50 on the basis of compatibility information.

Although the disclosure has been described with respect to only a limited number of embodiments, those skilled in the art, having benefit of this disclosure, will appreciate that various other embodiments may be devised without departing from the scope of the present invention. Accordingly, the scope of the invention should be limited only by the attached claims.

What is claimed is:

1. A non-transitory computer-readable storage medium storing a printer driver to be executed in a computing device which gives print instructions to a printer device, the printer driver including a printer driver core component and a print setup user interface component being separated from the printer driver core component, the printer driver, when being executed by a processor of the computing device, causing the computing device to perform processing comprising:

supplying, via the printer driver core component, information associated with a print feature or print features of the printer device; and controlling, via the print setup user interface component, a display section of the computing device to display one or more setup user interface portions on a basis of the information obtained from the printer driver core component, each of the one or more setup user interface portions allowing a user to setup a print feature of the printer device,
wherein the controlling the display section to display the one or more setup user interface portions includes,
obtaining designation information which designates the one or more setup user interface portions, from the printer driver core component,
determining whether a designated setup user interface portion which is designated by the designation information is implemented in the print setup user interface component,
in response to determining that the designated setup user interface portion is not implemented in the print setup user interface component, searching for a compatible setup user interface portion which is compatible with the designated setup user interface portion, by referring to compatibility information obtained in advance, to determine whether the compatible setup user interface portion is implemented in the print setup user interface component, and
in response to determining that the designated setup user interface portion or the compatible setup user interface portion is implemented in the print setup user interface component, controlling the display section to display the designated setup user interface portion or the compatible setup user interface portion.

2. The non-transitory computer-readable storage medium of claim 1,
wherein the controlling the display section to display the compatible setup user interface portion includes,
obtaining a setup option value corresponding to the designated setup user interface portion, the setup option value being designated by a PrintTicket obtained from the printer driver core component, and
on the setup option value being not selectable on the compatible setup user interface portion, modifying the setup option value so as to be selectable on the compatible setup user interface portion.

3. The non-transitory computer-readable storage medium of claim 1,
wherein the controlling the display section to display the one or more setup user interface portions further includes,
in response to determining that the compatible setup user interface portion is not implemented in the print setup user interface component, controlling the display section to hide the designated setup user interface portion.

4. The non-transitory computer-readable storage medium of claim 1,
wherein the compatibility information is capable of including an instruction to hide a setup user interface portion, and
the controlling the display section to display the one or more setup user interface portions further includes,
in response to determining that the designated setup user interface portion is not implemented in the print setup user interface component and to finding an instruction to hide the designated setup user interface portion in the compatibility information, controlling the display section to hide the designated setup user interface portion.

5. The non-transitory computer-readable storage medium of claim 3,
wherein the controlling the display section to hide the designated setup user interface portion includes controlling the display section to display information that the designated setup user interface portion cannot be displayed.

6. The non-transitory computer-readable storage medium of claim 4,
wherein the controlling the display section to hide the designated setup user interface portion includes controlling the display section to display information that the designated setup user interface portion cannot be displayed.

7. The non-transitory computer-readable storage medium of claim 1,
wherein the compatibility information is capable of defining a plurality of compatible setup user interface portions for one of the print features,
the searching for the compatible setup user interface includes
in response to determining that the designated setup user interface portion is not implemented in the print setup user interface component, searching for the plurality of compatibility setup user interface portions according to a predetermined priority.

8. The non-transitory computer-readable storage medium of claim 1,
wherein the print setup user interface component and the printer driver core component are different in version.

9. The non-transitory computer-readable storage medium of claim 8,
wherein a version of the print setup user interface component is older than a version of the printer driver core component.

10. The non-transitory computer-readable storage medium of claim 1,
wherein the printer driver is a version 4 printer driver to be executed on a Windows (a registered trademark) operating system.

11. The non-transitory computer-readable storage medium of claim 10,
wherein the printer driver core component includes DriverPropertybag in which the designation information and the compatibility information are defined.

12. The non-transitory computer-readable storage medium of claim 11,
wherein the designation information is defined by UITypeSettings in the DriverPropertybag and the compatibility information is defined by UITypeCompatibility in the DriverPropertybag.

13. A computing device communicable with a printer device through a communication network, comprising:
a display section;
a printer driver core section that supplies information associated with a print feature or print features of the printer device; and
a print setup user interface section that is separate from the printer driver core section and controls the display section to display one or more setup user interface portions on a basis of the information obtained from the printer driver core section, each of the one or more setup user interface portions allowing a user to setup a print feature of the printer device, the print setup user interface section including
a determining section that, using designation information which designates the one or more setup user interface portions and is obtained from the printer driver core section, determines whether a designated setup user interface portion which is designated by the designation information is implemented in the print setup user interface section, a searching section that, in response to the determining section determining that the designated setup user interface portion is not implemented in the print setup user interface section, searches for a compatible setup user interface portion which is compatible with the designated setup user interface portion, by referring to compatibility information obtained in advance, to determine whether the compatible setup user interface portion is implemented in the print setup user interface section, and a display control section that, in response to the determining section determining that the designated setup user interface portion in the print setup user interface section, or the searching section determining that the compatible setup user interface portion is implemented in the print setup user interface section, controls the display section to display the designated setup user interface portion or the compatible setup user interface portion.

14. The computing device of claim 13, wherein the print setup user interface section further includes a prohibition section that, on the display control section controlling the display section to display the compatible setup user interface portion, obtains a setup option value corresponding to the designated setup user interface portion, the setup option value being designated by a PrintTicket obtained from the printer driver core section, and on the setup option value being not selectable on the compatible setup user interface portion, modifies the setup option value so as to be selectable on the compatible setup user interface portion.

15. The computing device of claim 13, wherein, in response to the searching section determining that the compatible setup user interface portion is not implemented in the print setup user interface section, the display control section controls the display section to hide the designated setup user interface portion.

16. The computing device of claim 13, wherein the compatibility information is capable of including an instruction to hide a setup user interface portion, and in response to the determining section determining that the designated setup user interface portion is not implemented in the print setup user interface section, and to an instruction to hide the designated setup user interface portion being found in the compatibility information, the display control section controls the display section to hide the designated setup user interface portion.

17. The computing device of claim 15, wherein, on controlling the display section to hide the designated setup user interface portion, the display control section controls the display section to display information that the designated setup user interface portion cannot be displayed.

18. The computing device of claim 16, wherein, on controlling the display section to hide the designated setup user interface portion, the display control section controls the display section to display information that the designated setup user interface portion cannot be displayed.

19. A display method of a user interface of a printer driver to be executed in a computing device which gives print instructions to a printer device, the printer driver including a printer driver core component and a print setup user interface component being separated from the printer driver core component, the printer driver core component causing the computing device to supply information associated with a print feature or print features of the printer device, the print setup user interface component causing the computing device to control a display section of the computing device to display one or more setup user interface portions on a basis of the information obtained from the printer driver core component, each of the one or more setup user interface portions allowing a user to setup a print feature of the printer device, the method comprising:

obtaining designation information which designates the one or more setup user interface portions, from the printer driver core component, determining whether a designated setup user interface portion which is designated by the designation information is implemented in the print setup user interface component, in response to determining that the designated setup user interface portion is not implemented in the print setup user interface component, searching for a compatible setup user interface portion which is compatible with the designated setup user interface portion, by referring to compatibility information obtained in advance, to determine whether the compatible setup user interface portion is implemented in the print setup user interface component, and in response to determining that the designated setup user interface portion or the compatible setup user interface portion is implemented in the print setup user interface component, controlling the display section to display the designated setup user interface portion or the compatible setup user interface portion.

20. The method of claim 19 further comprising:

obtaining a setup option value corresponding to the designated setup user interface portion, the setup option value being designated by a PrintTicket obtained from the printer driver core component, and on the setup option value being not selectable on the compatible setup user interface portion, modifying the setup option value so as to be selectable on the compatible setup user interface portion.

21. The method of claim 19, further comprising in response to determining that the compatible setup user interface portion is not implemented in the print setup user interface component, controlling the display section to hide the designated setup user interface portion.

22. The method of claim 19, wherein the compatibility information is capable of including an instruction to hide a setup user interface portion, and the method further comprises, in response to determining that the designated setup user interface portion is not implemented in the print setup user interface component and to finding an instruction to hide the designated setup user interface portion in the compatibility information, controlling the display section to hide the designated setup user interface portion.

23. The method of claim 21, wherein the controlling the display section to hide the designated setup user interface portion includes controlling the display section to display information that the designated setup user interface portion cannot be displayed.

24. The method of claim 22,
wherein the controlling the display section to hide the designated setup user interface portion includes controlling the display section to display information that the designated setup user interface portion cannot be displayed.

\* \* \* \* \*